(12) United States Patent
Ockels

(10) Patent No.: US 6,827,033 B2
(45) Date of Patent: Dec. 7, 2004

(54) TRAILER FOR TRANSPORTING A VESSEL

(76) Inventor: Wubbo Johannes Ockels, Boekenroodeweg 45, Aerdenhout (NL), 2111 HK ( * ) Notice: Subject to any disclaimer, the term of this patent is extended or adjusted under 35 U.S.C. 154(b) by 0 days.

(21) Appl. No.: 10/001,841

(22) Filed: Nov. 21, 2001

(65) Prior Publication Data

US 2002/0078876 A1 Jun. 27, 2002

(30) Foreign Application Priority Data

Nov. 23, 2000 (NL) .............................................. 1016689
Mar. 8, 2001 (NL) .............................................. 1017533

(51) Int. Cl.⁷ .............................................. B63C 13/00
(52) U.S. Cl. ................................... 114/344; 280/414.1
(58) Field of Search ....................... 114/344; 280/414.1; 414/477, 478, 479

(56) References Cited

U.S. PATENT DOCUMENTS

| | | | |
|---|---|---|---|
| 3,140,003 A | * | 7/1964 | Horner |
| 3,357,581 A | * | 12/1967 | Scott |
| 3,826,391 A | | 7/1974 | Prince |
| 4,286,346 A | | 9/1981 | Wiek |
| 4,655,671 A | * | 4/1987 | Pratt |
| 5,722,809 A | | 3/1998 | Urbank |

FOREIGN PATENT DOCUMENTS

DE 529516 7/1931

* cited by examiner

Primary Examiner—Sherman Basinger
(74) Attorney, Agent, or Firm—Varnum, Riddering, Schmidt & Howlett LLP

(57) ABSTRACT

A trailer comprising a wheel axle frame (1) supporting at least one wheel axle (5) with wheels (6), which wheel axle frame (1) is hingedly connected on a front side via a pivot (10) with a towing hook gripping frame (2), which pivot (10) extends parallel to the at least one wheel axle (5), while a rigid boat supporting frame (3) is connected with the wheel axle frame (1) so as to be exclusively slidable or mobile, and with the boat supporting frame (3) a stem or stern support (11) is connected so as to be mobile, and with the boat supporting frame (3) further a hull support (12) is connected so as to be mobile, and with the wheel axe frame (1) light, elongate guide elements (4) are connected, which are fixable in a slid-in and slid-out position, while the trailer is provided with floats (9) connectible with the ends of the guide elements (4) remote from the towing hook gripping frame (2), while in a condition of transport the boat supporting frame (3) at least partly extends above the towing hook gripping frame (2), and in a slid-out unloading/loading condition, too, the boat supporting frame (3) is directly connected with the wheel axle frame (1).

43 Claims, 9 Drawing Sheets

TRAILER FOR TRANSPORTING A VESSEL

BACKGROUND OF THE INVENTION

1. Field of the Invention

The invention relates to a trailer for transporting a vessel.

2. Background Art

A trailer intended to create a slipway is known from U.S. Pat. No. 4,286,346. This trailer comprises a wheel axle frame and a boat supporting frame which is connected to a rear side of the wheel axle frame so as to be hingeable, but not slidable or mobile. An end of the boat supporting frame remote from the wheel axle frame is provided with a telescopically slidable frame extension piece. At the end of this frame extension piece, floats are mounted. Placed on the boat supporting frame is a movable keel table on which the vessel rests. To launch the vessel, the telescopic extension frame is slid out first. Subsequently, the mobile keel table is gradually moved backwards. After some time, the boat supporting frame tilts until the floats float in the water. The keel table is then moved further backwards over the boat supporting frame and the frame extension piece, so that the stern of the vessel comes to float in the water. To launch the vessel further, the floating bodies are emptied so that the boat supporting frame can tilt even further until the boat is completely in the water. An advantage of this trailer is that it enables bridging a difference in height between the water surface and the land surface on which the trailer is situated. A drawback of this trailer is that the tilting occur very suddenly when the keel table is moved backwards and will further end very abruptly when the floats touch the water. This sudden tilting is dangerous to bystanders. The abrupt ending of the tilting can lead to damage to the vessel and the trailer. Another drawback of this trailer is further that it is not designed to pull a vessel situated in the water out of the water. The fact is that this publication is silent as to how the vessel can be brought from the water onto the keel table of the trailer. Furthermore, the use of a telescopic extension mechanism is disadvantageous because it is a relatively weak mechanism, which is therefore hardly capable of supporting the weight of the vessel. This drawback is partly compensated by designing the keel table relatively long, which is also necessary to stably support the whole boat. As a result of this considerable length of the keel table, the effective length of the boat supporting frame over which the keel table can be moved is, however, limited. Moreover, the effective length of the slipway is limited because for launching this whole, relatively long table needs to be brought under the floating level of the vessel. Furthermore, this publication does not indicate a provision stabilizing the vessel sidewards in the case of a part of the vessel already being in a floating position. It is to be noted that by the term slipway is meant the way over which a vessel can be set into the water and can be pulled out of the water.

German patent 529,516 discloses a trailer comprising a relatively long wheel axle frame comprising guides and a keel support movably arranged thereon. Placed on the keel support is a movable stem support. In use, the wheel axle frame is arranged on the shore in an inclined position, such that it forms an artificial slipway. Subsequently, the keel support is moved with the vessel to the water by moving the keel support over the wheel axle frame, during which the keel support slides out of the wheel axle frame. The stem support movable over the keel support only serves to move the boat over the keel support to the water over half a boat length. A drawback of this trailer is that only a slipway of a relatively small length can be supplied therewith. This length comprises at most three quarters of the boat length when the keel table is in the extreme position. Another drawback is that the trailer can only be used when the wheel axle frame, in the tilted position, rests the shore bottom. Because the trailer is not provided with floats, it is not suitable for use on any quay.

British patent 372,172 discloses a trailer provided with a wheel axle frame to which a boat supporting frame is connected so as to be hingeable, but not slidable or mobile. In use, an artificial slipway can be obtained with thin trailer through the hinging of the boat supporting frame relative to the wheel axle frame. A drawback of this equipment is that the length of the thus obtained slipway is at most half a boat length. Therefore, this trailer can only be used in a limited number of situations. Moreover, the position of the wheels of the trailer is such that, in use, only half of the boat supporting frame can extend from the wheel axle frame to the water. Therefore, this trailer can only used if the distance between the ground level on which the trailer is situated and the water surface of the launching water is very small. Since, moreover, floating bodies are lacking, launching is only possible on so-called stationary slipways especially arranged in the shore.

U.S. Pat. No. 3,140,003 discloses a trailer for moving a vessel provided with a telescopically slidable wheel axle frame. Mounted on the telescopically slidable part of the wheel axle frame are fixed keel supports on which the boat can rest with its keel. The known trailer will have to be of relatively heavy design because both the fixed and the slidable part of the wheel axle frame must be able to support the full weight of the vessel. Another drawback of this trailer is that a vessel cannot be set into relatively deep water therewith, because during the loading and unloading of a vessel the end of the boat supporting frame needs support from a fixed bottom and is not provided with floats

SUMMARY OF THE INVENTION

It is an object of the present invention to remove the above drawbacks. It is therefore an object of the invention to provide a trailer suitable and intended for being towed by a passenger car, s.u.v. or the like, by means of which a vessel can be set into the water and can be pulled out of the water without using a slipway especially constructed for the purpose, which trailer tan be used to bridge different, relatively great distances and/or differences in height between the shore or quay and the water surface. Here, the trailer must also be able to be of light design, but has great stiffness, To this end, the trailer according to the invention is characterized by the features according to claim 1.

The rigid boat supporting frame is, in use, moved with a vessel along the guide elements from the wheel axle frame to the water to set the vessel into the water, or moved in reverse direction to pull the vessel out of the water. Because the boat supporting frame is of rigid design and is connected with the wheel axle frame, the guide elements can be of light design. The fact is that the risk of the guide elements bending too much is very low, because a substantial part of the weight of the vessel is transferred by the rigid boat supporting frame to the wheel ale frame and because the guide elements are clamped by guide means connected wit the rigid boat supporting frame, which guide means are connected with the boat supporting frame in different positions of the boat supporting frame. Therefore, the parts of the guide elements extending along the boat supporting frame will hardly, if at all, bend. In use, the major part of the boat supporting frame can extend from the wheel axle frame to the water, so that a very long, but yet very rigid slipway of at least one boat length, preferably almost the whole trailer length, is obtained therewith. This is advantageous if a relatively great launching height and/or launching distance need to be bridged. Furthermore, with this trailer a vessel with a relatively great draught, such as, a sailing boat with a fixed keel, can be simply launched without the keel making contact with a shore surface and/or the fixed bottom under the water. Since the trailer according to the invention is equipped with a separate hull support and stem or stern support, these can have a relatively short length, while yet a stable support of the vessel is realized. This has the result that a minimum length of the boat supporting frame is lost, and therefore a maximally long slipway is obtained. Since the boat supporting frame can extend over practically the whole length of the trailer (in the Netherlands the maximum length of a trailer is 12 m), for a trailer admitted under Netherlands law a slipway with a considerable length of about 11 m can be created.

An additional advantage is that the boat supporting frame can be moved relative to the wheel axle frame and relative to a vessel situated on the boat supporting frame. Consequently, the boat supporting frame can be situated, at least in the condition of transport, near a towing hook of a towing vehicle, while the vessel is placed at a greater distance from the towing vehicle. As a result thereof, even the distance required between the vessel and the vehicle so that bends can be taken, is utilized for storage of a part of the boat supporting frame. Consequently, the boat supporting frame can have an even greater length. Thus the trailer can be provided with a relatively long boat supporting frame, so that a relatively long slipway can be provided therewith. Furthermore, this trailer is very simple in use and can therefore be operated by only one person to set a vessel into the water or pull a vessel out of the water.

In use, the light guide elements are brought into the slid-out position and fixed relative to the wheel axle frame. In this initial situation, the boat supporting frame extends in a mainly horizontal transport position. Then the floats are connected with the free ends of the guide elements and filled with air or gas. Subsequently, the boat supporting frame is moved over the wheel axle frame in the direction of the floats of the guide elements. When the vessel is not yet situated at an end of the boat supporting frame, the boat supporting frame can also be moved under the vessel, while the position of the vessel is fixed relative to the wheel axle frame; only when the vessel has reached the of the boat supporting frame, the boat supporting frame and the vessel can be moved together further relative to the wheel axle frame. If available, the towing hook gripping frame is preferably coupled to a towing hook of a towing vehicle, which renders uncoupling operations superfluous and can effect gradual launching. The fact is that at a certain moment the center of gravity of the boat supporting frame and the vessel will be displaced relative to the wheel axle of the wheel axle frame such that the wheel axle frame comes to tilt about the wheel axle. The tilting is inhibited by the force exerted by the coupled towing vehicle on the wheel axle frame via the towing hook gripping frame. Consequently, this tilting will be effected very gradually, which is a great advantage of this trailer. If no towing hook frame is available and the towing hook coupling is connected with the boat supporting frame, the wheel axis frame, during launching, can be secured to the vessel with a number of lines or bands. Preferably, the trailer wheels are blocked during launching, for instance with their own brake or stop blocks, and the towing vehicle is gradually braked. Each time, the wheel axle frame, during a small further movement of the boat supporting frame relative to the wheel axle frame, will assume a new stable tilting position. When the boat supporting frame is moved further over a specific distance relative to wheel axle frame, the floats of the guide elements will touch the water surface and assume a floating position. In this situation, the wheel axle frame and the boat supporting frame cannot tilt any further, because the floats and the guide elements exert a counteracting moment on the boat supporting frame. Subsequently, the boat supporting frame can be moved completely in the direction of the floats, while the guide elements provide guidance and only to a limited extent experience a force from the weight of the vessel. In that situation, the freely projecting part of the guide elements subjected to a bending moment is already rather small, since the major part of the guide elements is already clamped by the guide elements fixed to the rigid boat supporting frame. Through this small length, bending will hardly, if at all, occur. Thus the guide elements are prevented from bending too far as a result of the weight of the vessel. When the end of the boat supporting frame proximal to the water has reached the floats, a stable, firm slipway has been realized. Subsequently, the vessel is moved to the water along the boat supporting frame by means of the stem or stern support and the hull support. The vessel is then only fixed to the above stern or stern support. When the vessel is completely in the water, it can be uncoupled from the stem or stern support, so that the launching is completed. To pull the vessel out of the water, the above steps must be carried out in reverse order.

Preferably, the floats are so designed through the degree of filling the floats with air or gas that the depth with which the boat supporting frame extends into the water during launching can be controlled. It is of special advantage if the form of the floats is of such design that, also when partly filled, these floats always assume a stable position in the water. To this end, the floats may have flexible walls. The height of the floater bags determines the maximum depth with which the end of the boat supporting frame proximal to the water can extend into the water. Thus the floats, for instance for some types of vessels, in particular keel boats, may have a height of 2 m, so that during setting into the water and pulling out of the water the vessel comes loose from the keel table, or can move with the keel to above the keel table he floats may be fixed to a float frame, which float frame is connected with the ends of the guide elements. The supply of air or gas to the floats may take place via the guide elements, preferably hollow design, and the float frame, preferably of hollow de sign.

According to a very advantageous elaboration of the invention the wheel axle frame supports a second wheel axe provided with wheels.

During the tilting of the wheel axle frame, the wheels of the second wheel axle frame exert an additional force, so that the tilting of the wheel axle frame can proceed extra gradually. The sides of the tires of the wheels, an optional suspension of the wheel axle frame and such elastically designed provisions may contribute to his. Furthermore, with a second wheel axle frame a better road behavior of the trailer can be obtained. Besides, the use of a second wheel axle frame is advantageous in connection with safety, for instance when one of the tires becomes leaky during transport of the vessel. Preferably, the second wheel axle frame is located near the first wheel axle frame, so that the wheels can properly cooperate with each other to allow the tilting of the wheel axle frame to proceed gradually and with a large number of intermediate positions in a wide angle range (typically 15°). The tilting may proceed over a relatively large angle.

According to a very advantageous elaboration of the invention the boat supporting frame comprises a box-frame-lattice construction provided with longitudinally extending tubes for moving the boat supporting frame along guide wheels of the wheel axle frame arranged for the purpose and for moving or guide the stem or stern support and the hull support thereover.

The above construction is very firm and very rigid. Moreover, such a construction can be of very light design without loss of firmness and rigidity. The construction is simply movable along the wheel axle frame, the stem or stern support and the hull support. By means of the guide wheels the movement can he controlled and carried out without failures.

According to a very advantageous elaboration of the invention the trailer is provided with wheels mountable to the free ends of the guide elements and/or the free end of the boat supporting frame.

The vessel may be very simply transferred from the trailer to the shore by using these wheels and by means of hull supports placed on the shore. To this end, the wheels are mounted to the free ends of the guide elements or the free end of the boat supporting frame, according to the guide elements used. The use of these guide elements is per se not necessary, because the tilting will proceed gradually, as will be discussed below. When the guide elements are used, they are then brought into the slid-out position and fixed relative to the wheel axle frame. Subsequently, the boat supporting frame is moved over the wheel axle frame in the direction of the mounted wheels. At a certain moment the center of gravity of the boat supporting frame and the vessel will be displaced relative to the wheel axle of the wheel axle frame such that the wheel axle frame gradually tilts about the wheel axle, as already discussed above. When the boat supporting frame is moved further relative to the wheel axle frame over a specific distance, the wheels mounted to the fee ends of the guide elements and/or the boat supporting frame will touch the ground surface of the shore. In this situation, the wheel axle frame and the boat supporting frame will not tilt any further, because the shore exerts a counteracting moment on the boat supporting frame. Subsequently, the boat supporting frame is moved completely in the direction of the mounted wheels. The vessel can then be moved over a distance along the boat supporting frame by means of the stem or stern support and the hull support in the direction of the mounted wheels, so that a stem or stern support of the vessel is brought closer to the ground surface of the shore. The vessel is only fixed to the stem or stern support. Subsequently, a first pair of hull supports is placed between a hull part of the vessel situated near the ground surface of the shore and the shore. Then the trailer is moved by a towing vehicle coupled thereto in a direction away from that first pair of hull supports, while the mounted wheels effect movement of the free ends of the guide elements or the free end of the boat supporting frame over the ground surface. This is advantageous, because thus damage to those ends is prevented. Furthermore, the movement of the trailer can smoothly, proceed by using these wheels. Through the movement of the trailer the first pair of hull supports placed between the shore and the vessel takes over a hull part of the vessel from the boat supporting frame. Thus the vessel is already on the shore with the first pair of hull supports. Because the stem or stern support is movable relative to the boat supporting frame, the boat supporting frame, during movement, will be moved under the vessel, while the stem or stern support moves over the boat supporting frame in the direction of the mounted wheels. The vessel rotates from an inclined position parallel to the boat supporting frame into a horizontal position. When the vessel is in the horizontal position, a second pair of hull supports is placed under the hull of the vessel on the shore. Then the vessel can be detached from the stem or stern support and the trailer can be driven off. Thus the vessel is placed on the above supports on the shore. The vessel can thus be very rapidly, stably and horizontally placed on the shore. When placing on the shore, the underside of the hull is easily accessible to carry out repair work. The stable placement farther provides safety to bystanders of the vessel. Furthermore, the empty trailer can be used to transport another vessel. To this end, the above steps can be taken in reverse order to transfer a vessel from the shore to the trailer.

DETAILED DESCRIPTION

Figure 1:
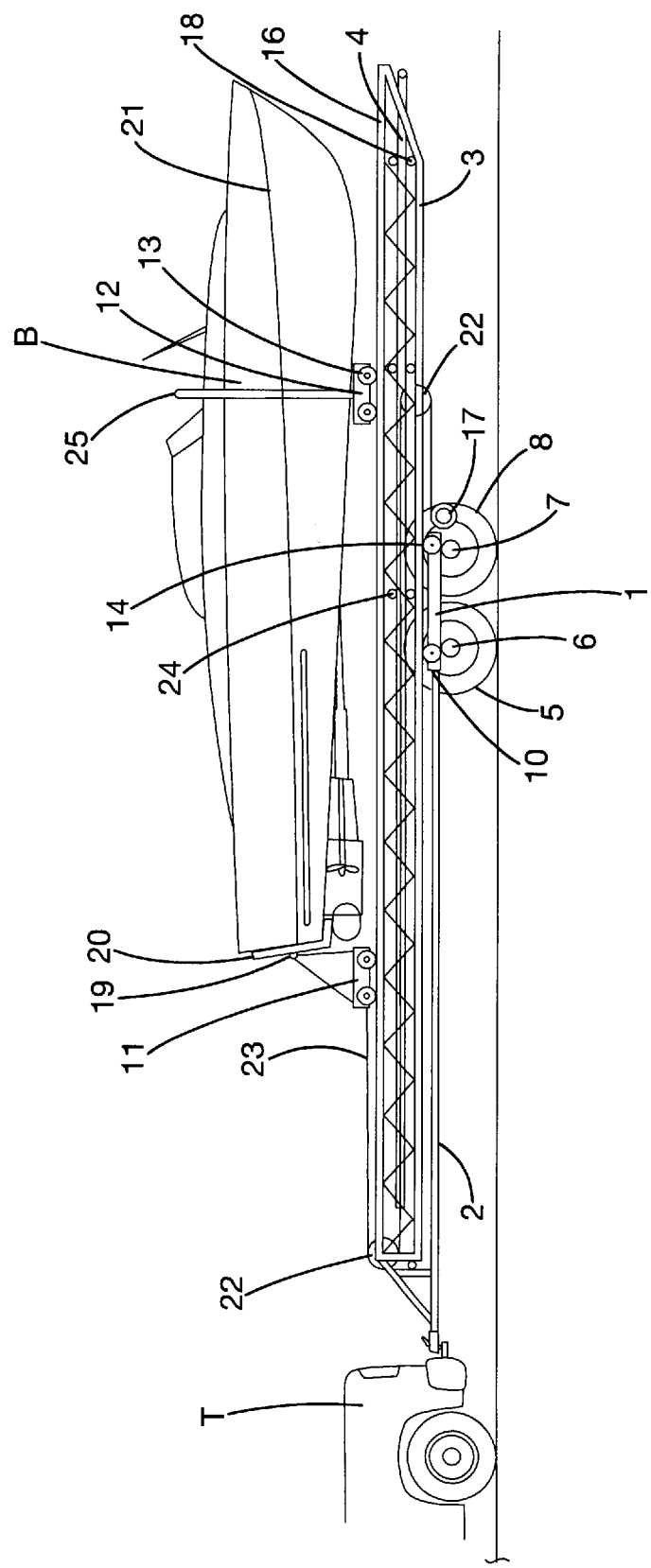
FIG. 1 shows an exemplary embodiment of a trailer according to the invention, with a vessel placed in a transport position on the trailer.

The exemplary embodiment represented in the drawings comprises a trailer for transporting behind a passenger car, or s.u.v., a vessel B of a weight up to about 3 tons. As is represented in FIG. 1, the trailer is provided with a wheel axle frame 1 with a first wheel axle 5 and a second wheel axle 7 which carry wheels 6 and 8, respectively. The wheels 6, 8 have been omitted in FIGS. 1 and 2 for clarity. At a front side, the wheel axle frame 1 is hinged via a pivot 10 to a towing hook engagement frame 2. Preferably during loading or unloading of the vessel B, a towing hook of a towing vehicle T is connected with this towing hook engagement frame 2. The pivot 10 mentioned extends parallel to the two wheel axles 5, 7. A rigid boat supporting frame 3 is connected with the wheel axle frame 1 so as to be mobile. To that end, the wheel axle frame 1 is provided with guide means in the form of rollers 14 arranged behind each other (see FIGS. 3 and 6). With the boat supporting frame 3, a stern support 11 and a hill support 12 are connected so as to be mobile. To that end, the stern support 11 and hull support 12 are provided with rollers 13 (see FIGS. 1 and 6). The stern support 11 and hull support 12 are arranged to support, respectively, the stern and the hull part of the vessel B, so that the vessel B can be moved over the boat supporting frame a in a longitudinal direction of the boat supporting frame 3. The trailer is provided with coupling means, not represented, for the purpose of coupling the stern support 11 to the boat supporting frame 3 on the one hand and the boat supporting frame 3 to the wheel axle frame 1 on the other. Such coupling means can comprise, for instance, locking pins which are connected with the boat supporting frame a on opposite sides of the two supports 11, 12. Also, the trailer is provided with coupling means, for instance a cable, to couple the stern support 11 to the wheel axle frame.

The boat supporting frame 3 comprises a box-frame lattice construction which is provided with longitudinally extending tubes 16 and cross-bars 15. This construction can be made of relatively light design, while the construction has a high stiffness and strength. The two lower tubes 16b are guided along the rollers 14 of the wheel axle frame 1. The two upper tubes 16a guide the rollers 13 of the stern support 11 and the hull support 12.

The wheel axle frame 1 is provided with a first winch 17 with a winch cable 23. For the purpose of guiding this winch cable 23 the boat supporting frame 3 is provided with two return wheels 22. The return wheels 22 are arranged in the longitudinal direction of the boat supporting frame 3 at a fixed distance from each other. With the aid of the winch 17, in the first place the stern support 11 can be moved over the boat supporting frame 3 in a direction R when the stern support 11 is uncoupled from the boat supporting frame 3. Further, with the aid of the winch 17 the boat supporting frame 3 can be moved in the direction R when it is coupled to the stern support 11 and is uncoupled from the wheel axle frame 1. With a second winch 27, of which the associated cable is coupled to the boat supporting frame 3, the boat supporting frame 3 can be moved relative to the wheel axle frame. Preferably, the first and the second winches 17 and 27, respectively, are motor-driven winches. This applies in particular to the first winch 17 because it must furnish the force to move the mass of the vessel B along the boat supposing frame 3 when that supporting frame 3 is in an inclined loading/unloading position.

Figure 3:
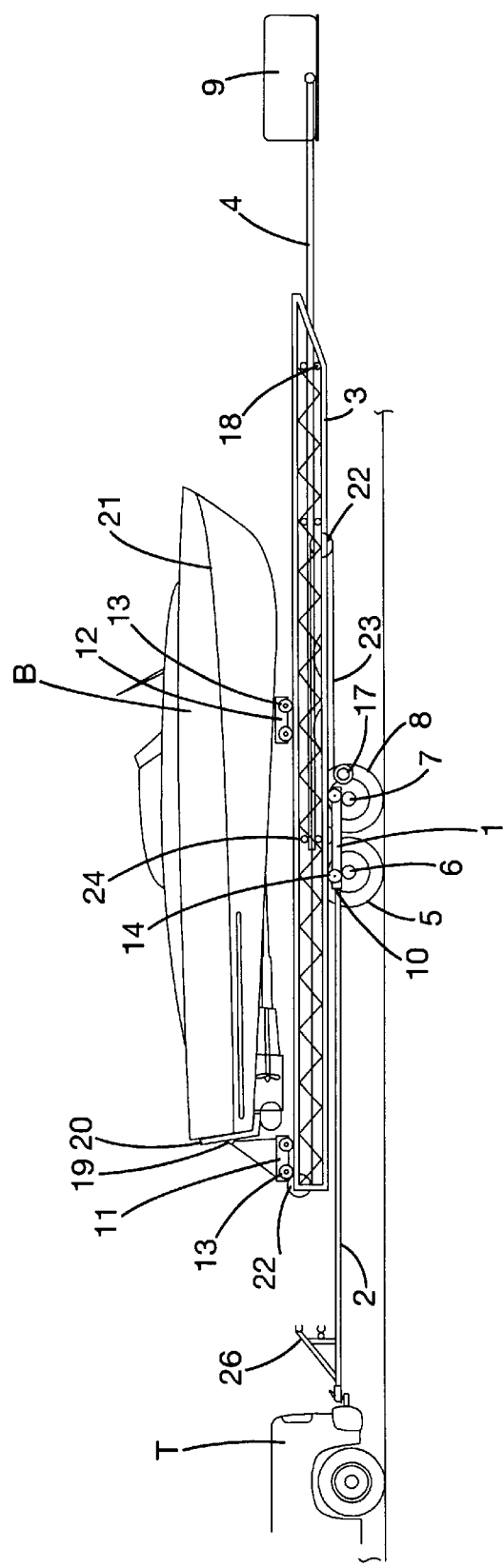
FIG. 3 shows the exemplary embodiment represented in FIG. 2, with slid-out guide elements and mounted floats.
Figure 4:
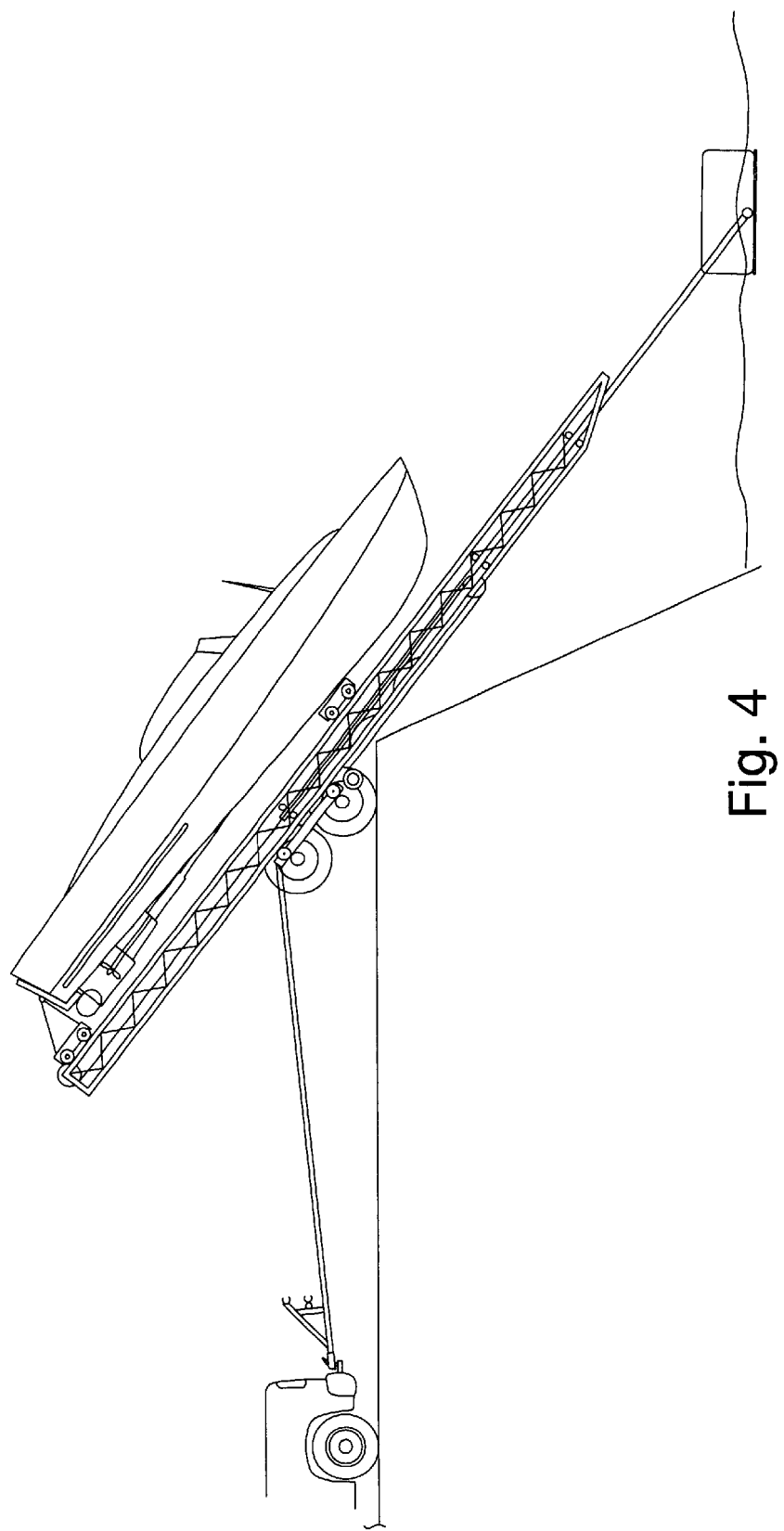
FIG. 4 shows the exemplary embodiment represented in FIG. 3, with the boat supporting frame and the wheel axle frame tilted and the floats floating on the water.

The stem support 11 is provided with a support part 20, pivotable about hinge 19, on which the stern of the vessel B is supported. The vessel B is tied to the support part 20 of the stern support 11, at least lashed up with the aid of lash-up means not represented, such as a lash-up jack, by means of a tightening band 21 which is represented in FIGS. 3 and 4. The tightening band 21 is fitted around the hull of the vessel B and said support part 20, such that the tightening band 21 makes a loop around the stem of the vessel B. As a result, the vessel B can be held in a position parallel to the boat supporting frame 8.

In the figures, two light, tubular guide elements 4 are represented which are each slidably coupled to the boat supporting frame 3 through three roller pairs 18. Connected with the wheel axle frame 1 are fixing means 24 with the aid of which the guide elements 4 can be fixedly connected in a position with the wheel axle frame 1. These fixing means 24 can be designed as clamps which engage the guide elements 4. The guide elements 4, in a slid-in and slid-out position, are able to the wheel axle frame 1 with the aid of the clamps 24. The guide elements 4 can be provided at an end with floats 9 which comprise air chambers. The air chambers can be filled with the aid of air supply means to impart buoyancy to the floats 9. To that end, each tubular guide element 4 is preferably used as an air supply line. As a result, air can be simply pumped into the air chambers of the floats 9, for instance by connecting air pumps to ends of the tubular guide elements 4 remote from the floats 9 and connecting the air chambers to the opposite ends of the guide elements 4, for instance with gas tubes. Filling the air chambers can then be done while the floats 9 are already in a position beyond the reach of a trailer operator. Further, the floats 9 are pivotally connected to ends of the guide elements 4, so that these ends in use are located under water, at least when the boat supporting frame 3 is in a loading/unloading condition as represented in FIG. 4.

Transport of the vessel B with the aid of the trailer occurs in the transport condition represented in FIG. 1. The boat supporting frame 3 then extends at least partly above the towing hook engagement frame 2. The stern support 11 is secured to the boat supporting frame 3, while the boat supporting frame 3 is secured to the wheel axle frame 1. Normally, during transport, in view of safety, it is desirable there is a particular distance between the gate part of the vessel B and the towing vehicle T. This is because too small a distance entails the risk of the vessel B contacting the towing vehicle when the trailer pivots about the towing hook in a bend. The risk that the boat supporting frame 3 touches the vehicle is much smaller because the boat supporting frame 3 is considerably narrower than the vessel B placed thereon. Therefore the end of the boat supporting frame 3 proximal to the towing vehicle can be located at a shorter distance from that towing vehicle T than is represented in FIG. 1, the supporting frame 3 also extending above the part of the towing hook engagement frame 2 indicated with L. Since the length of a trailer behind a towing vehicle, at least in the Netherlands, is bound to a maximum length prescribed by law, the trailer can thus comprise a boat supporting frame 3 of optimum length, which is desirable to obtain a longest possible launching slope. Thus, the length of the boat supporting frame 3 can be as many as 11 meters.

In an alternative embodiment, not shown, the boat supporting frame 3 may be provided with a towing hook coupling 29. Optionally, the boat supporting frame 3 can be provided with a towing hook coupling 29 both at a front side and at a rear side. During road transport, use is then made of this towing hook coupling 29, while only when launching the vessel into the water and pulling it out, the trailer is coupled with the vehicle via a towing hook engagement frame of light design or via lines or straps. Optionally, during launching, a coupling with the vehicle can even be omitted altogether. In that case, it is obviously necessary that the wheels of the wheel axle frame be braked, thereby preventing the trailer from moving during launching. If use is made of a towing hook engagement frame as mentioned, such frame can be made of much lighter design in that embodiment, because the frame does not fulfill any function during road transport.

In the exemplary embodiment shown, on the towing hook engagement frame 2, adjacent the towing hook coupling, a connecting support 26 is provided, to which the boat supporting frame is coupled during transport of the trailer. The pull force exerted by the vehicle therefore proceeds via the connecting support 26 directly to the boat supporting frame 3. The parts of the towing hook engagement frame located behind the connecting support 26 are therefore not subject, or hardly so, to tensile loading and can therefore be made of light design. In an alternative elaboration of the invention it is even possible to design the towing hook engagement frame as loose rods, which are mounted and connected with the towing hook of the towing vehicle only when launching the vessel. Uncoupling the boat frame from the towing hook and coupling the towing hook engagement frame can be simply effected in that the vessel can first be positioned with its center of gravity straight above the wheel axle frame, which has already been described hereinabove. As a result of this, the trailer will not tilt during the uncoupling of the boat supporting frame and the coupling of the towing hook engagement frame.

Figure 2:
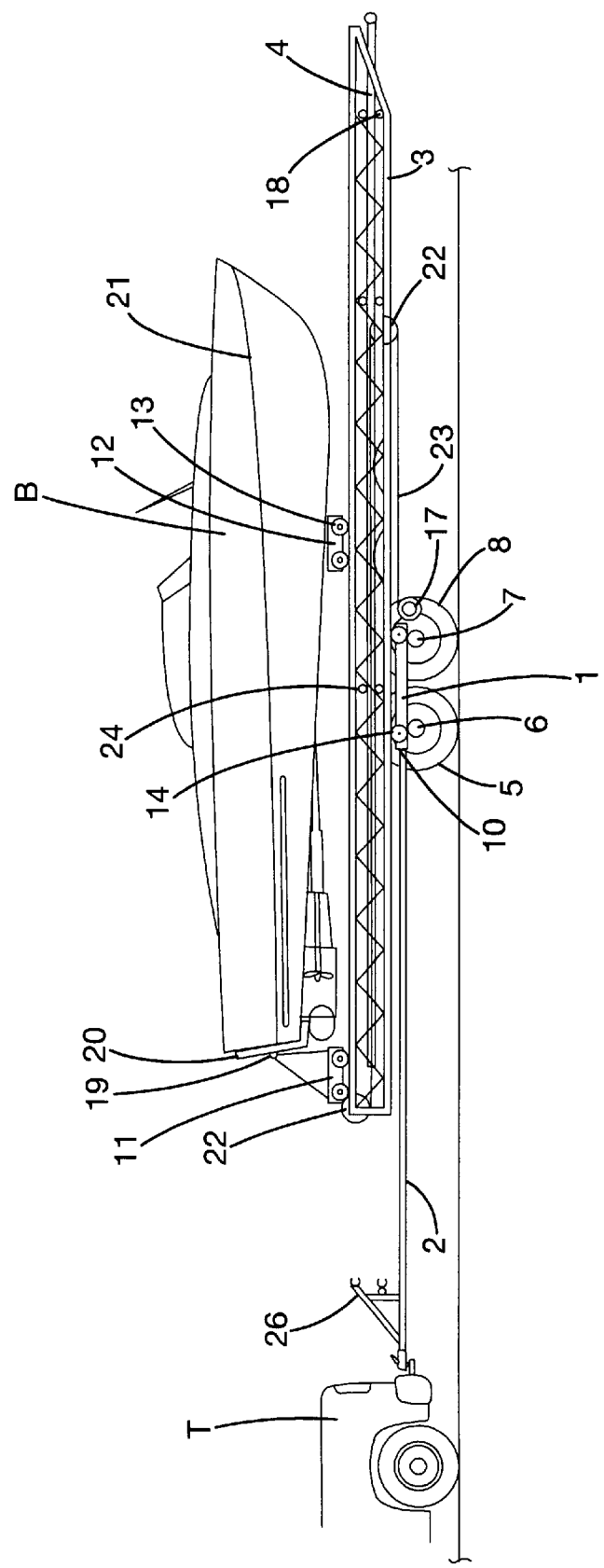
FIG. 2 shows the exemplary embodiment represented in FIG 1, with the vessel placed in a launching position on the trailer.

For launching, the floats 9 are connected with the free ends of the guide elements 4, whereafter the guide elements 4 are brought from the retracted to the extended position and are fixed to the wheel axle frame 1 with the clamps 24, as is represented in FIG. 3. The air chambers of the preferably flexible floats 9 are inflated with air. The trailer is positioned on the shore G such that the guide elements 4 extend above the water W. The stern support 11 to which the vessel B is connected, is fixed to the boat supporting frame 3. Preferably, the stern support 11 is then situated at the end of the boat supporting frame 3 remote from the floats 9, as is represented in FIGS. 2 and 3. This is advantageous because it is thus achieved that the weight of the vessel B is transmitted for a large part to the wheel axle frame 1 and not to the guide elements 4 when the boat supporting frame 3 is moved along the guide elements 8 to the water as described in the following.

In a next step, the provision by which the boat supporting frame 3 is secured to the wheel axle frame 1 is undone. Thereafter the boat supporting frame 3 is moved over the wheel axle frame 1 in the direction of arrow P, for instance manually or with a winch. The winch cable 28 of the winch 17 is thereby paid out, though in such a manner that it remains under a particular winch tension. After the boat supporting frame 3 with the vessel B has been displaced over a particular distance, the wheel axle frame 1 will start to tilt about the wheels 6 of the first wheel axle 5. In the figure, the tilting direction is designated with arrow Q. This tilting is counteracted by a pull force of the weight of the towing vehicle T standing still, which is coupled via the engagement part 2 to the wheel axle frame 1. Further, the tilting can be counteracted by a spring force of the wheels 8 of the second wheel axle frame 7. Therefore tilting will proceed uniformly, with a new, stable tilted position arising each time upon a further displacement of the boat supporting frame 3 over the wheel axle frame 1. The hinge 10 hereby moves up in a direction H, since the wheel axle frame 1 is connected with a hinge 10 to the towing hook engagement part 2.

Figure 5:
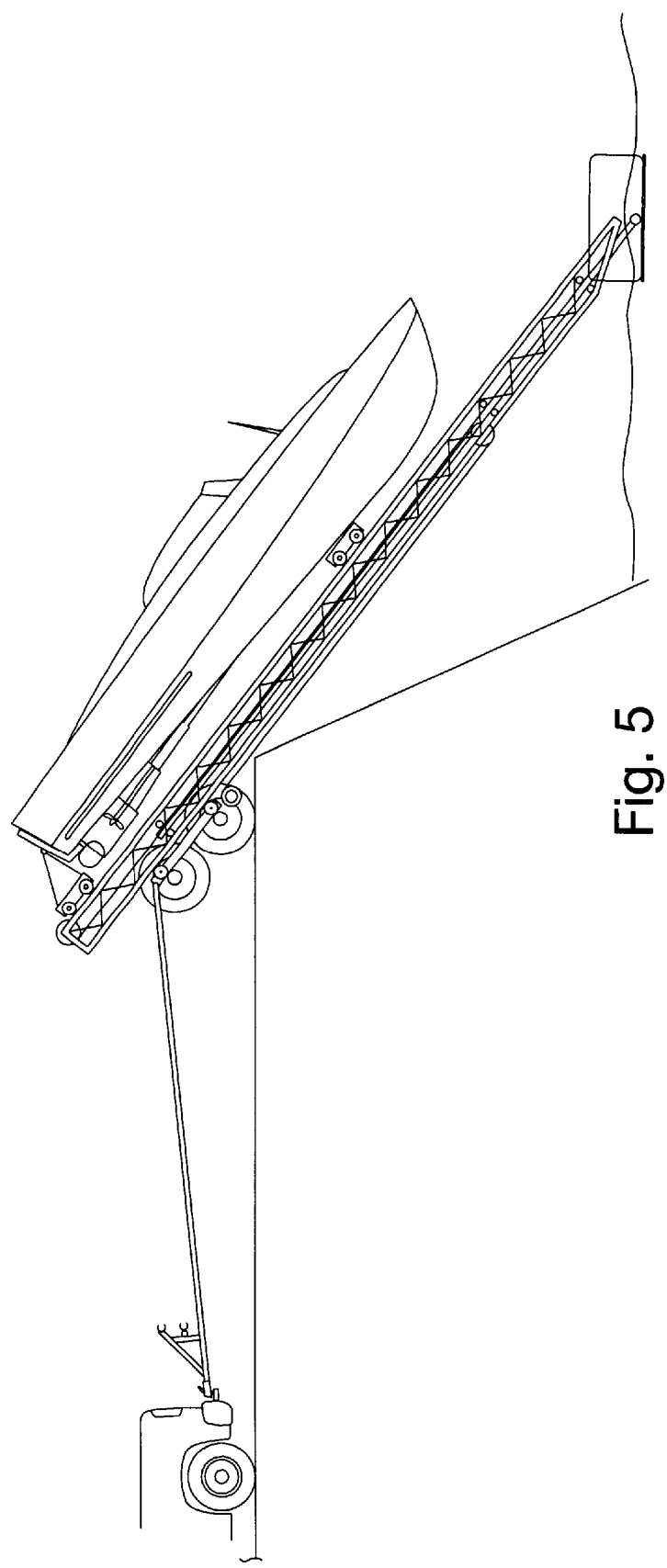
FIG. 5 shows the exemplary embodiment represented in FIG. 4, with the boat supporting frame brought into a loading/unloading condition.

After further tilting of the wheel axle frame 1 with the boat supporting frame 3, the floats 9 will contact the launching water W and counteract the tilting with buoyancy, as represented in FIG. 4. Thereafter the boat supporting frame 3 is moved to the floats utilizing the winch 17, at least by paying out the winch cable 23, and guided by the guide elements 4. A considerable part of the weight of the vessel B is thereby taken up via the wheel able frame 1. Therefore the guide elements 4 can be made of light design and the chance that these elements 4 bend too far owing to a force exerted by the boat supporting frame a is very slight. Moreover, the roller pairs 18 prevent bending of the guide elements 4 along the boat supporting frame 8. The end of the boat supporting frame 3 proximal to the floats 9 is provided with stop means which prevent that end moving beyond the free ends of the guide elements. Therefore a stable launching is created as represented in FIG. 5.

Figure 6:
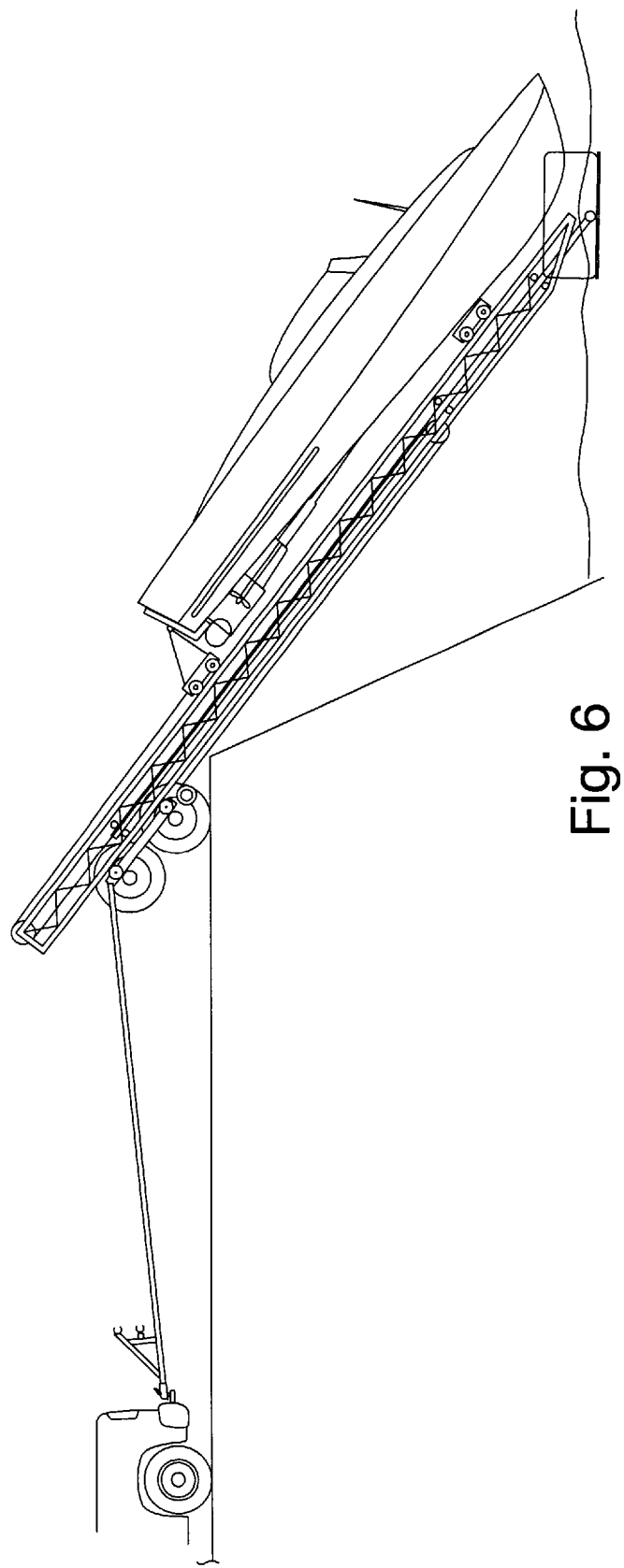
FIG. 6 shows the exemplary embodiment represented in FIG. 5, with the vessel displaced over a distance over the boat supporting frame towards the water.
Figure 7:
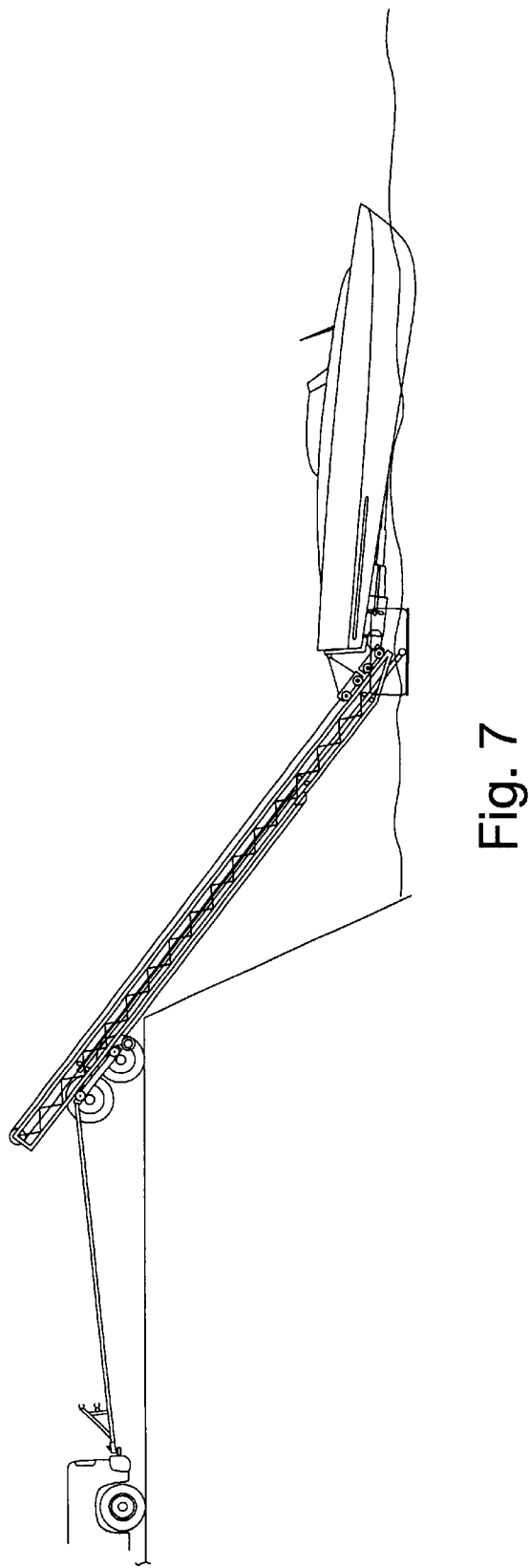
FIG. 7 shows the exemplary embodiment represented in FIG. 6, with the stem part of the vessel floating on the water and the stern part of the vessel supported on the stern support.
Figure 8:
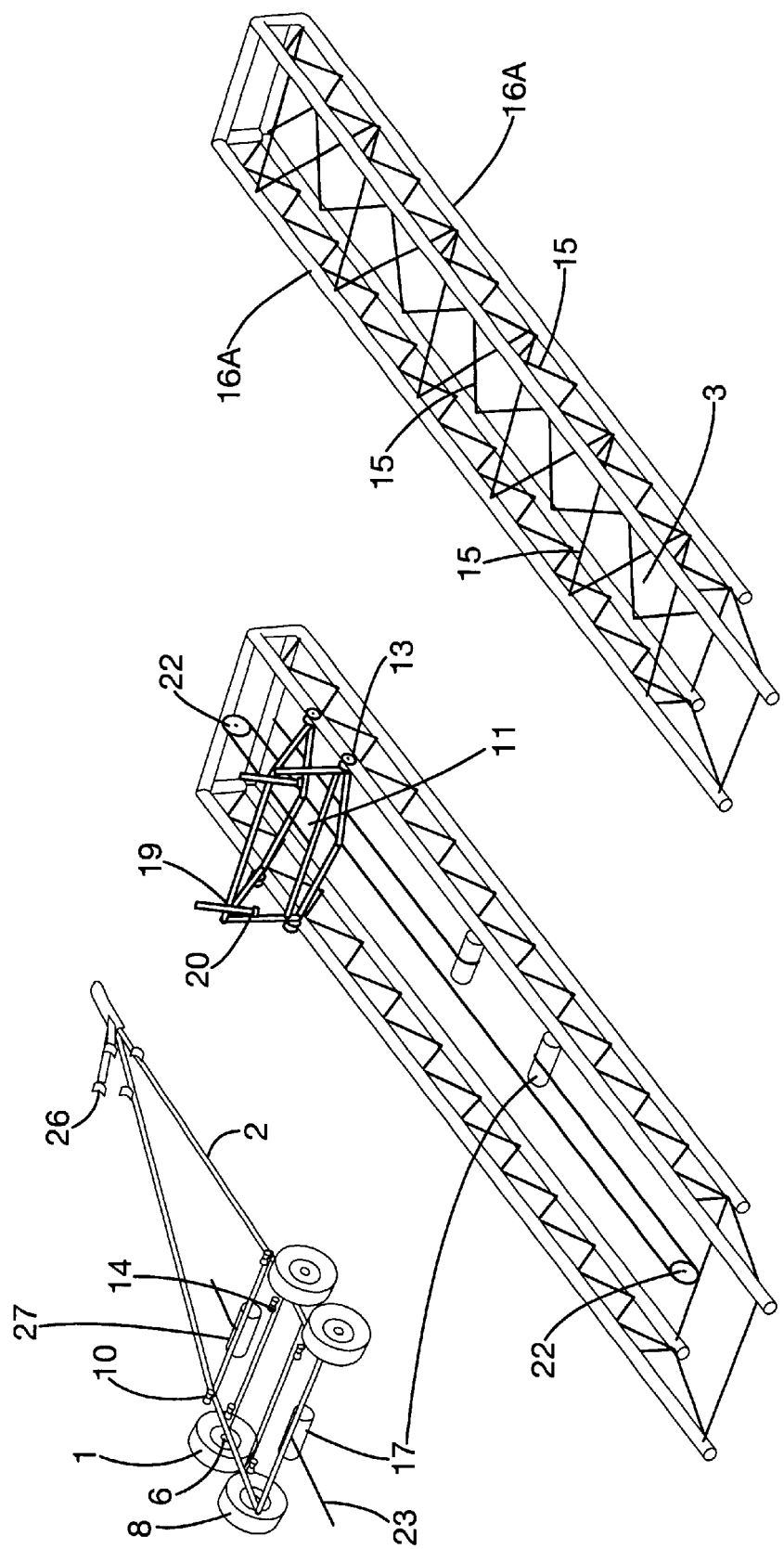
FIG. 8 shows a perspective view of the wheel axle frame, the towing hook engagement part and the boat supporting frame.
Figure 9:
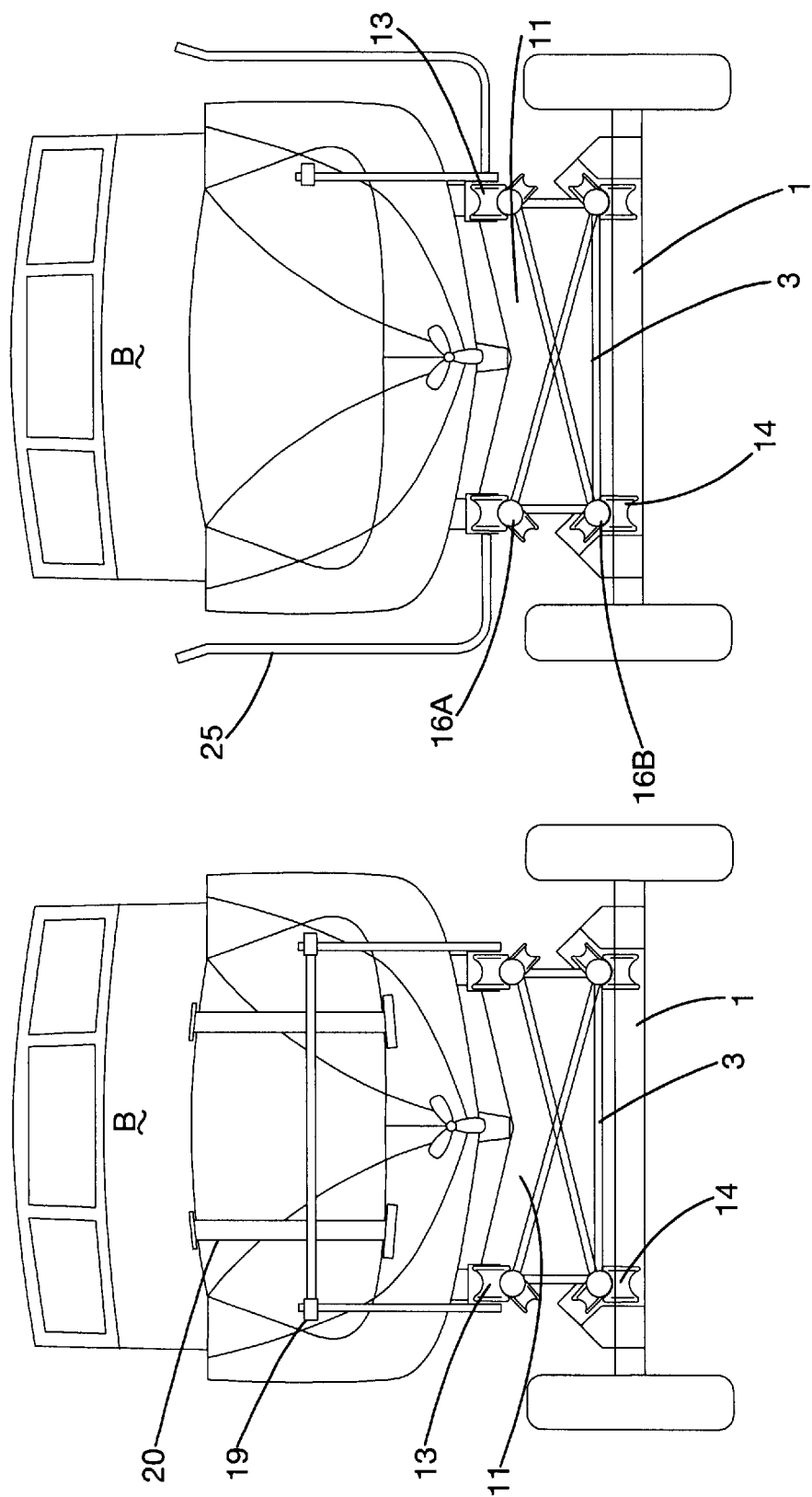
FIG. 9 shows cross sections of the trailer with vessel.

Next, the vessel B is set into the water via the boat supporting frame 3 as represented in FIG. 6. To that end, the stern support 11 is uncoupled from the boat supporting frame 3 and the winch cable of the winch 17 is further paid out. When the stern support 11 has been brought to the water W, the vessel B can float on that water W, which is shown in FIG. 7. The support part 20 of the stern support 11 has pivoted along with the vessel B about the hinge 19. Thereafter the vessel B is uncoupled from the stern support 11 and launching has been completed.

For the purpose of hauling the vessel B out of the water, the above-mentioned steps can be simply carried out in reverse order. The vessel B is then sailed rearwards between the floats 9 to the stern support 11. During this maneuver the vessel B is guided straight above the hull support 12 by the two rods 25 connected with the hull support 12 and extending upwards on opposite sides of the hull support 12.

Optionally, the trailer can be provided with wheels 28 and 30 which are mountable on the free ends of the guide elements 4 and/or the free end of the boat supporting frame 3. With these wheels, the vessel can be placed very simply on supports on the shore, as has already been described. With the wheels the free ends of the guide elements and/or the free end of the boat supporting frame 3 can be smoothly wheeled over the shore while the vessel B is transferred from the trailer onto the supports arranged on the shore. Further, the wheels prevent the free ends of the guide elements 4 and/or the boat supporting frame 3 from being damaged during this maneuver.

It will be clear that the invention is not limited to the exemplary embodiment described.

Thus, with vessels having a center of gravity situated far back, such as, for instance, modern speedboats, the vessel can be placed on the trailer with the stem directed forwards. The wheel axle frame is then located somewhat further backwards during road transport, viz. under the center of gravity of the boat, which results in a more stable road behavior. During launching the vehicle can then first place the trailer parallel to the quay. Then the vehicle can be uncoupled and the guide elements 4 with floats 9 can be slid out in the direction of the front side of the vessel. Thereafter the vehicle can be coupled on the other side of the trailer, to position the trailer relative to the quay, such that the vessel can be launched with the front side facing forwards. Further, the floats 9 can comprise, for instance, a plastic of a low specific weight, for instance polystyrene foam or like material. Also, each float can comprise one or a few air chambers to impart buoyancy to each float. The air chambers can be bounded by flexible or fixed walls. In addition, the air chambers and/or gas supply means can be provided with valves. An air chamber provided with a flexible wall is preferably provided in opposite sides with a seam, as in a sandwich bag, such that the air chamber has an arcuate top also when partly filled with gas. The air in the partly filled bag rises in the bag, so that in this bag an elongate air-filled cylinder is formed, under which the two sides of the bag are pressed against each other by the water pressure. In this manner, the stability of the float partly filled with air can be enhanced. Further, with such a flexible air chamber the floating height of the float can be properly controlled and hence the depth to which the fire end of the boat supporting frame extends into the water.

In addition, the boat supporting frame construction 3 can be manufactured from metal, glass fiber material, carbon fiber material or the like.

Further, the guide elements 4 can be manufactured of different materials, for instance a metal, glass fiber material, carbon fiber material, or the like.

Detachably fixing the different movable parts of the trailer relative to each other can be accomplished in different ways, for instance with the aid of cables, ropes, locking bolts and/or locking pins, or a combination of these or other fixing means.

The hull support can also be designed in such a manner that a vessel with a long keel can be placed on it. Optionally, to that end, the hull support can be provided on opposite sides with long, upwardly extending side supports, so that the keel rests on the hull support and the hull of the vessel is laterally clamped and rests on the side supports.

What is claimed is:

1. A trailer for transporting a vessel, the trailer comprising:
    a wheel axle frame supporting at least one wheel axle provided with wheels, the wheel axle frame comprising at least one towing hook coupling arranged for cooperation with a towing hook;
    a rigid boat supporting frame connected to the wheel axle frame, the boat supporting frame extending in a longitudinal direction and movably relative to the wheel axle frame in the longitudinal direction;
    a stem support for supporting a stem of a vessel, the stem support being movably connected to the boat supporting frame;
    a hull support for supporting a hull of a vessel, the hull support connected to the boat supporting frame and movable relative to the boat supporting frame in the longitudinal direction of the boat supporting frame;
    a plurality of light, elongate guide elements slidably connected to the wheel axle frame and fixable relative to the wheel axle frame in a slid-in and a slid-out position; and
    a plurality of floats connectable with ends of the guide elements;
    the boat supporting frame directly connected with the wheel axle frame and comprising a plurality of guides disposed at a number of positions in the longitudinal direction of the boat supporting frame and cooperating with the guide elements, whereby upon sliding-out of the rigid boat supporting frame, the light, elongate guide elements stiffen through clamping in the guides.

2. The trailer according to claim 1 wherein the wheel axle frame comprises a further wheel axle provided with wheels.

3. The trailer according to claim 1 wherein the wheel axle frame comprises guide wheels and the boat supporting frame comprises a box-frame-lattice construction provided with longitudinally extending tubes for guiding the boat supporting frame along the guide wheels of the wheel axle frame, the stem support and the hull support.

4. The trailer according to claim 1 wherein each float comprises at least one air chamber.

5. The trailer in accordance with claim 4 wherein each of the guide elements comprises a gas supply line and wherein at least one of the floats comprises an air chamber provided with a connector for bringing the air chamber in connection with a gas supply line.

6. The trailer in accordance with claim 1 wherein the floats are hingedly connected to the guide elements.

7. The trailer in accordance with claim 1 wherein the hull support has opposite sides and wherein the trailer is provided with two rods connected with the hull support and extending upwardly on opposite sides of the hull support, whereby a vessel can be received between the rods.

8. A trailer according to claim 1, wherein the wheel axle frame is provided with a winch for selectively moving the stem support and the stem support and the boat supporting frame.

9. The trailer according to claim 8 and further comprising a winch provided with a winch cable and wherein the boat supporting frame is provided with return wheels, spaced apart in a longitudinal direction of the boat supporting frame, for guiding the winch cable.

10. The trailer according to claim 1 and further comprising coupling means for selectively coupling the stem support and the stem support to the boat supporting frame.

11. The trailer according to claim 1 and further comprising a coupling for coupling the boat supporting frame to the wheel axle frame.

12. The trailer according to claim 1, wherein the stem support is arranged to hold the vessel such that the vessel can only pivot about a pivot extending in a direction parallel to the axle of the wheel axle frame.

13. A trailer according to claim 1 and further comprising a stern support arranged to hold the vessel with a tightening band extending around a hull of a vessel.

14. A trailer according to claim 1, wherein the guide elements of the boat supporting frame each have a free end and wherein the trailer comprises wheels mountable to the free end of the guide elements and to the free end of the boat supporting frame.

15. The trailer in accordance with claim 1 and further comprising a towing hook gripping frame and a pivot extending in a direction parallel to the at least one wheel axle, wherein the wheel axle frame has a front side hingedly connected to the towing gripping frame via the pivot and wherein, in a condition of transport, the boat supporting frame extends at least partly above the towing hook gripping frame.

16. The trailer in accordance with claim 15 wherein the towing hook gripping frame is detachably connected to the wheel axle frame.

17. The trailer in accordance with claim 15, wherein the wheel axle frame comprises a front side and a rear side and wherein the towing hook gripping frame is selectively mountable on said front side and said rear side.

18. The trailer in accordance with claim 17 wherein the boat supporting frame has a front side and a rear side and a towing hook coupling connected to said front side and a towing hook coupling connected to said rear side.

19. The trailer in accordance with claim 15, wherein the boat supporting frame has a front side and a rear side and a towing coupling on each of said front side and said rear side of said boat supporting frame.

20. The trailer in accordance with claim 1, wherein the guides are wheels.

21. A trailer for transporting a vessel comprising a wheel axle frame supporting at least one wheel axle with wheels and at least one towing hook coupling arranged for cooperation with a towing hook;
    a rigid boat supporting frame connected to the wheel axle frame and extending in a longitudinal direction;
    a stern support connected to the boat supporting frame and movable relative to the boat supporting frame in the longitudinal direction;
    a hull support for supporting the hull of a vessel and connected to the boat supporting frame, the hull support movable in the longitudinal direction;
    a plurality of elongate guide elements connected to the wheel axle frame and fixable relative to the wheel axle frame between a slid-in and a slid-out position;
    a plurality of floats connectable to the elongate guide elements;
    the boat supporting frame comprising a plurality of guides spaced apart in a number of positions in the longitudinal direction for cooperation with the guide elements such that upon a sliding out of the rigid boat supporting frame, the light, elongate guide elements stiffen through clamping in the guides.

22. The trailer in accordance with claim 21 and further comprising a second wheel axle supported on the wheel axle frame and provided with wheels.

23. The trailer in accordance with claim 22 wherein the wheel axle frame, the stern support and the hull support are provided with guide wheels and the boat supporting frame comprises a box-frame-lattice construction provided with longitudinally extended tubes for guiding the boat supporting frame along the guide wheels of the axle frame, the stem support and the hull support.

24. The trailer in accordance with claim 22, wherein each float comprises at least one air chamber.

25. The trailer in accordance with claim 24, wherein each of the guide elements comprises a gas supply line and wherein each float comprises at least one air chamber provided with a connector for bringing the air chamber into gas communication with the gas supply line.

26. The trailer in accordance with claim 21, wherein the floats are hingedly connected to the guide elements.

27. The trailer in accordance with claim 21, wherein the trailer comprises a plurality of rods connected to the hull support and extending upwardly on opposite sides of the hull support, and adapted to receive a vessel.

28. The trailer in accordance with claim 21, wherein the wheel axle frame comprises a winch for moving the stem support the boat supporting frame.

29. A trailer according to claim 28, wherein the winch is provided with a winch cable and the boat supporting frame extends in a longitudinal direction and comprises return wheels spaced apart in the longitudinal direction for guiding the winch cable.

30. The trailer in accordance with claim 21, wherein the trailer further comprises a coupling arrangement for coupling the stem support to the boat supporting frame.

31. The trailer in accordance with claim 21 and further comprising a coupling device for coupling the boat supporting frame to the wheel axle frame.

32. The trailer in accordance with claim 21, wherein the stem support comprises a band arranged as to extend around the hull of the vessel for retaining the vessel.

33. The trailer in accordance with claim 21, wherein the boat supporting frame has a length of not more than 11 meters.

34. The trailer in accordance to claim 21, wherein the guide elements each have a the trailer comprises wheels mountable to the free ends.

35. The trailer according to claim 21, and further comprising a towing hook gripping frame and a towing hook coupling connect to the towing hook gripping frame and wherein the wheel axle frame is hingedly connected to the towing hook gripping frame via a pivot extending in a direction parallel to the wheel axle and wherein, in a condition of transport the boat supporting frame extends at least partly above the towing hook gripping fame.

36. The trailer according to claim 35, wherein the towing hook gripping frame is detachably connected to the wheel axle frame.

37. The trailer in accordance with claim 36, wherein the wheel axle frame has a front side and a rear side and wherein the towing hook gripping frame is selectively mountable both on the front side and on the rear side of the wheel axle frame.

38. The trailer in accordance with claim 37, wherein the wheel axle frame has a front side and a rear side and the towing hook gripping frame is selectively mountable on the front side and the rear side of the wheel axle frame.

39. The trailer in accordance with claim 21, wherein at least one towing hook coupling is connected to the boat supporting frame.

40. The trailer according to claim 39, wherein the boat supporting frame has a front side and a rear side and a towing hook coupling on each of the front side and the rear side.

41. A trailer in accordance with claim 21, wherein the guides, cooperating with the guide elements, are wheels.

42. The trailer in accordance with claim 21, wherein the guides cooperating with the guide elements are ball bearings.

43. The trailer in accordance with claim 21, wherein the guides cooperating with the guide elements are sliding bearings.

* * * * *